(12) United States Patent
Gould et al.

(10) Patent No.: US 10,836,499 B2
(45) Date of Patent: Nov. 17, 2020

(54) TURBINE ENGINE WITH SINGLE WALL CANTILEVERED ARCHITECTURE

(71) Applicant: General Electric Company, Schenectady, NY (US)

(72) Inventors: Kenneth Arthur Gould, Winchester, MA (US); Martin Miles D'Angelo, Boston, MA (US); Daniel Waslo, Marblehead, MA (US); Brian Lewis Devendorf, Georgetown, MA (US); Mark Gregory Wotzak, Chestnut Hill, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 582 days.

(21) Appl. No.: 15/682,834

(22) Filed: Aug. 22, 2017

(65) Prior Publication Data
US 2019/0061965 A1 Feb. 28, 2019

(51) Int. Cl.
*B64D 27/26* (2006.01)
*F02C 7/20* (2006.01)
*F01D 25/24* (2006.01)
*F02C 3/10* (2006.01)
*F02C 3/14* (2006.01)
*F02C 6/20* (2006.01)
*F01D 25/28* (2006.01)

(52) U.S. Cl.
CPC ............. *B64D 27/26* (2013.01); *F01D 25/24* (2013.01); *F01D 25/28* (2013.01); *F02C 3/103* (2013.01); *F02C 3/145* (2013.01); *F02C 6/206* (2013.01); *F02C 7/20* (2013.01); *B64D 2027/262* (2013.01); *B64D 2027/268* (2013.01); *F05D 2220/324* (2013.01); *F05D 2230/53* (2013.01); *F05D 2240/90* (2013.01)

(58) Field of Classification Search
CPC .............. B64D 27/26; B64D 2027/262; B64D 2027/268; B64D 27/12
See application file for complete search history.

(56) References Cited

U.S. PATENT DOCUMENTS

| 3,152,443 A | 10/1964 | Newland |
| 3,327,473 A | 6/1967 | Smith |
| 3,830,058 A | 8/1974 | Ainsworth |
| 4,503,668 A | 3/1985 | Duncan, III et al. |

(Continued)

OTHER PUBLICATIONS

Extended European Search Report and Opinion issued in connection with corresponding EP Application No. 18189814.9 dated Jan. 21, 2019.

(Continued)

*Primary Examiner* — Brian M O'Hara
*Assistant Examiner* — Michael B. Kreiner
(74) *Attorney, Agent, or Firm* — Hanley, Flight & Zimmerman, LLC

(57) ABSTRACT

An apparatus and method for mounting a turbine engine to an aircraft can include an engine core for the turbine engine including a compressor section, a combustor section, and a turbine section in flow arrangement. At least one strut couples to the engine core about a single mount plane. A structural wall at least partially defining a mainstream flow path couples to the at least one strut and passes through the compressor section and the turbine section.

16 Claims, 3 Drawing Sheets

(56) References Cited

U.S. PATENT DOCUMENTS

| | | | |
|---|---|---|---|
| 4,785,625 A * | 11/1988 | Stryker | F02C 7/20 |
| | | | 60/226.1 |
| 5,452,575 A | 9/1995 | Freid | |
| 5,746,391 A | 5/1998 | Rodgers et al. | |
| 7,325,770 B2 | 2/2008 | Chevalier et al. | |
| 7,785,625 B2 | 8/2010 | Kim et al. | |
| 9,410,441 B2 | 8/2016 | Macfarlane | |
| 2014/0069107 A1 | 3/2014 | Macfarlane | |

OTHER PUBLICATIONS

Canadian Intellectual Property Office, Office Action re Application No. 3,013,731, dated Jun. 18, 2019, 4 pages, Gatineau, Quebec.
Canadian Intellectual Property Office, "Office Action," dated Mar. 3, 2020 in connection with Canadian Patent Application No. 3,013,731, 5 pages.
Japanese Patent Office, "First Office Action," dated Oct. 8, 2019 in connection with Japanese Patent Application No. 2018-152835, 4 pages.
The State Intellectual Property Office of the People's Republic of China, "Office Action," dated Jul. 23, 2020 in connection with Chinese Patent Application No. 201810952997.9, 8 pages (including partial translation).

* cited by examiner

TURBINE ENGINE WITH SINGLE WALL CANTILEVERED ARCHITECTURE

BACKGROUND OF THE INVENTION

Turbine engines, and particularly turboprop or free-turbine engines, are driven by a flow of air and combusted gases. Such turbine engines can include a turbine section having a high-pressure turbine and a low-pressure turbine each driving a separate shaft. The HP turbine drives a high-pressure shaft connected to a compressor section, while the low-pressure turbine drives a low-pressure shaft coupled to a propeller, gearbox, or fan section.

Some turbine engines can include a reverse flow combustor used to reverse flow twice within the engine. The flow is reversed a first time to combust the gas and a second time to exhaust the gas through the turbine section.

BRIEF DESCRIPTION OF THE INVENTION

In one aspect, the present disclosure relates to a turbine engine including an engine core having a compressor section, a combustor section, and a turbine section in sequential flow arrangement. At least one mounting strut couples to the engine core along a single mount plane between the compressor section and the turbine section. A structural wall supporting the engine couples to the mounting strut and extends within at least the compressor section and the turbine section. The structural wall forms the mainstream flow path and at least partially extends through the compressor section and the turbine section.

In another aspect, the present disclosure relates to a turbine engine comprising an engine having a compressor section and a turbine section. The turbine engine includes a mainstream flow path in sequential flow arrangement along the compressor section and the turbine section. A mounting strut is configured to mount the engine core to an aircraft along a single mount plane. A single structural wall at least partially forms the mainstream flow path and extends through the compressor section and the turbine section.

In yet another aspect, the present disclosure relates to a method of mounting a turbine engine to an aircraft includes supporting the engine core with at least one mounting strut about a single mount plane at a single mount and supporting a single structural wall with the at least one mounting strut, with the single structural wall at least partially forming a mainstream flow path through the turbine engine.

DETAILED DESCRIPTION OF THE INVENTION

Figure 1:
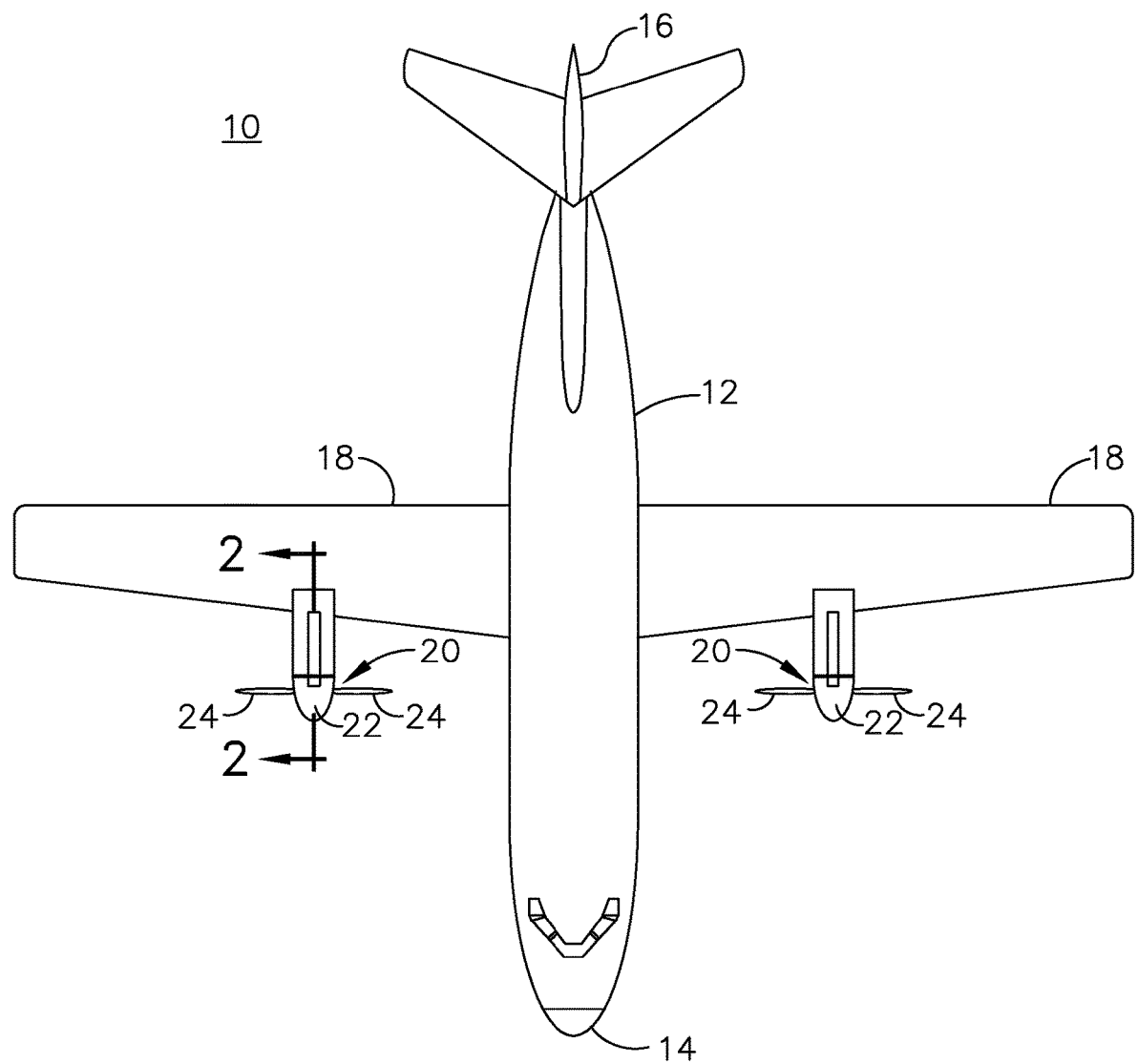
FIG. 1 is a top view of an aircraft having turbine engines mounted to the wings.

Aspects of the disclosure described herein are directed to a turbine engine mounted to an aircraft along a single mount plane and having a single structural wall forming the mainstream flow path for the turbine engine. For purposes of illustration, the present disclosure will be described with respect to a reverse-flow, turboprop turbine engine. It will be understood, however, that aspects of the disclosure described herein are not so limited and that the single mount plane a single structural wall as described herein can be implemented in other turbine engines, including but not limited to turbojet, turboprop, turboshaft, and turbofan engines. Furthermore, while described with respect to an aircraft, aspects of the disclosure discussed herein may have general applicability within non-aircraft engines such as other mobile applications and non-mobile industrial, commercial, and residential applications. It should be appreciated that the aspects as described herein are not limited to a reverse flow combustor, but can have similar applicability in any turbine engine, with or without a reverse flow combustor.

As used herein, the term "forward" refers to moving in a direction toward the propeller or fan, or a component being relatively closer to the propeller or fan as compared to another component. The term "aft" refers to a direction toward the rear of the engine, opposite of the forward propeller or fan. The term "upstream" as used herein refers to a location nearer to an engine air inlet, while the term "downstream" as used herein refers to moving toward an engine exhaust. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an aircraft 10 can include a body 12 having a nose 14 and a tail 16, with two wings 18 extending from the body 12. A pair of engines 20 mount to the wings 18 and include a propeller section 22 having a set of propeller blades 24. It should be understood that the number of engines 20 and the mount position of the engine 20 is exemplary as shown, and can include any number of engines 20 in any position along the aircraft 10. In one additional non-limiting example, a single engine can be mounted to the nose 14 with no engines mounted along the wings 18.

Figure 2:
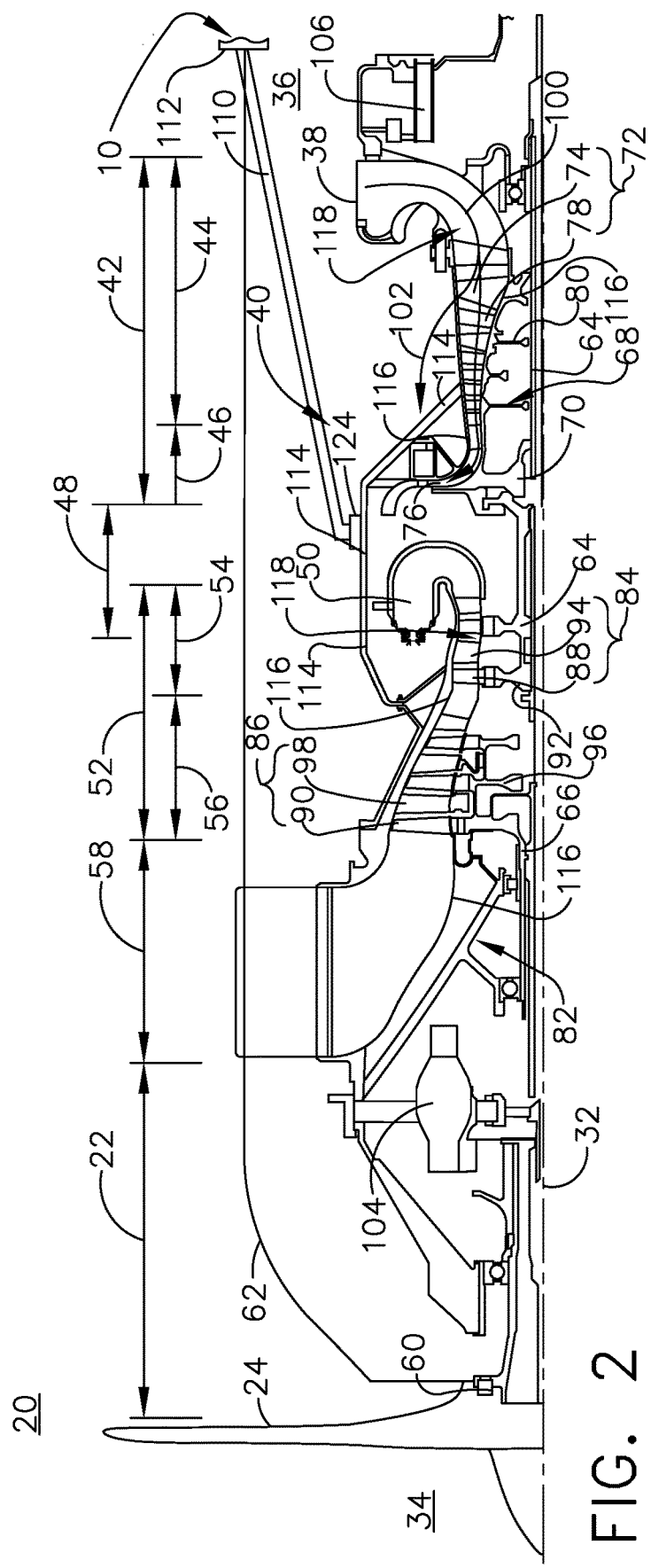
FIG. 2 is a schematic cross-sectional diagram of one turbine engine for the aircraft of FIG. 1 taken across section 2-2.

Referring to FIG. 2, the engine 20, such as one used in subsonic flight, has a generally longitudinally extending axis or centerline 32 extending forward 34 to aft 36. The engine 20 is illustrated as a free-turbine, turboprop engine where air is taken in at an inlet 38 and flows in a generally aft 36 to forward 34 direction. The engine 20 includes an engine core 40 including, in downstream serial flow relationship, a compressor section 42 including the inlet 38, an axial compressor section 44 and a centrifugal compressor section 46, a combustion section 48 including a combustor 50, a turbine section 52 including a high-pressure (HP) turbine section 54 and a low-pressure (LP) turbine section 56, an exhaust section 58, and the propeller section 22. The combustor 50 is illustrated as a reverse flow combustor, where the aft-to-forward flow direction is reversed through the combustor 50, and then reversed again entering the turbine section 52. The propeller section 22 includes a propeller hub 60 coupled to the plurality of propeller blades 24 disposed radially about the propeller hub 60. An engine nacelle or casing 62 can form an annular housing for the engine core 40. It should be understood that the engine is shown in cross-section, with only one-half of the cross-section visible above the engine centerline 32. It should be appreciated that the engine 20 is annular and includes a circumferential arrangement of interior components typical to a turbine engine.

An HP shaft or spool 64 disposed coaxially about the centerline 32 of the engine 20 drivingly connects the HP turbine section 54 to the axial compressor section 44 and centrifugal compressor section 46. An LP shaft or spool 66, also disposed coaxially about the centerline 32 of the engine 20 in line with and separate from the HP spool 64, drivingly connects the LP turbine section 56 to the propeller hub 60. The driving of the LP turbine section 56 drives the LP spool 66 to rotate the propeller hub 60 and in turn the propeller blades 24. The spools 64, 66 are rotatable about the engine centerline 32 and couple to a plurality of rotatable elements, which can collectively define a rotor 68.

The compressor section 44 includes at least one compressor stage 72, in which a set of compressor blades 74 rotate relative to a corresponding set of static compressor vanes 78 (also called a nozzle) to compress or pressurize the stream of fluid passing through the stage 72. The centrifugal compressor section 46 can include an impeller 70 having a set of impeller vanes 76. In a single compressor stage 72 multiple compressor blades 74 can be provided in a ring and can extend radially outwardly relative to the centerline 32, while the corresponding static compressor vanes 78 are positioned downstream of and adjacent to the rotating blades 74. It is noted that the number of blades, vanes, and compressor stages shown in FIG. 1 were selected for illustrative purposes only, and that other numbers are possible.

The blades 74, 76 for a stage of the compressor mount to a disk 80, which mounts to the corresponding HP spool 64 with each stage having its own disk 80. The vanes 78 for a stage of the compressor mount to a structural wall 116, described in detail herein, in a circumferential arrangement.

The HP turbine section 54 and the LP turbine section 56 respectively include a plurality of turbine stages 84, 86, in which a set of turbine blades 88, 90 are rotated relative to a corresponding set of static turbine vanes 94, 98 (also called a nozzle) to extract energy from the stream of fluid passing through the stage. In a single turbine stage 84, 86, multiple turbine blades 88, 90 can be provided in a ring and can extend radially outwardly relative to the centerline 32, while the corresponding static turbine vanes 94, 98 are positioned upstream of and adjacent to the rotating blades 88, 90. It is noted that the number of blades, vanes, and turbine stages shown in FIG. 1 were selected for illustrative purposes only, and that other numbers are possible.

The blades 88 for the HP turbine stages 84 can mount to a disk 92, which mounts to the corresponding HP spool 64, with each stage having a dedicated disk 92. The blades 90 for the LP turbine stages 86 can mount to a disk 96, which mounts to the corresponding LP spool 66, with each stage having a dedicated disk 96. The vanes 94, 98 for a stage of the turbine can mount to the structural wall 116 in a circumferential arrangement.

Complementary to the rotor portion, the stationary portions of the engine 20, such as the static vanes 78, 94, 98 among the compressor and turbine sections 42, 52 are also referred to individually or collectively as a stator 82. As such, the stator 82 can refer to the combination of non-rotating elements throughout the engine 20.

In operation, the airflow entering the inlet 38 is channeled into the axial compressor section 44, which then supplies pressurized air 100 to the centrifugal compressor section 46, which further pressurizes the air. The pressurized air 100 from the centrifugal compressor section 46 mixes with fuel in the combustor 50 where the fuel combusts, thereby generating combustion gases. The HP turbine section 54 extracts some work from these gases, which drives the axial compressor section 44 and centrifugal compressor section 46. The HP turbine section 54 discharges the combustion gases into the LP turbine section 56, which extracts additional work to drive the LP turbine section 56, and the exhaust gas is ultimately discharged from the engine 20 via the exhaust section 58.

A portion of the pressurized airflow 100 can be drawn from the compressor section 42 as bleed air 102. The bleed air 102 can be drawn from the pressurized airflow 100 and utilized in other areas of the engine or aircraft, such as provided to engine components requiring cooling. The temperature of pressurized airflow 100 entering the combustor 50 is significantly increased. As such, cooling provided by the bleed air 102 is necessary for operating of such engine components in the heightened temperature environments.

A gearbox 104, such as a reduction gearbox in one non-limiting example, is provided between the LP spool 66 and the propeller hub 60. Additionally an accessory gear box 106 positioned aft 36 of the axial compressor section 44 can be provided to power other parts of the engine 20 by way of non-limiting example, fuel pumps, fuel control, oil pumps, a starter/generator, and a tachometer.

A mounting strut 110 can extend to the engine core 40 from the aircraft 10 or an aircraft structural element 112, such as components within the wing or nose of the aircraft 10, and can mount to the engine core 40 between the compressor section 42 and the turbine section 52. The mounting strut 110 can be coplanar with the engine centerline 12, for example. One or more structural elements 114 can mount to the mounting strut 110 for mounting the remaining components of the engine 20 about the mounting strut 110. Such structural elements 114, in non-limiting examples, can include the structural wall 116, or mounting shafts, rods, bars, beams, fasteners, bolts, nuts, screws, or other necessary structural elements suitable to secure the engine core 40 to the aircraft 10. A strut mount 124 can be used to couple the mount shaft 110 to the structural elements 114. The strut mount 124 facilitates connection between the mounting strut 110 and the structural elements 114 or the structural wall 116. It should be understood that while a single mounting strut 110 is shown, a set of or plurality of mounting struts 110 can extend to mount to the engine core 40 around the circumference of the engine 20. Furthermore, a the mounting strut 110 need not be a strut, but can be any other suitable structural member to couple the engine core 40 to the aircraft 10, such as a rod, bar, shaft, or beam in non-limiting examples.

The structural wall 116 couples to the mounting strut 110 and at least partially forms a mainstream flow path 118 extending through the engine core 40. The structural wall 116 can couple directly or indirectly to the mounting strut 110.

Figure 3:
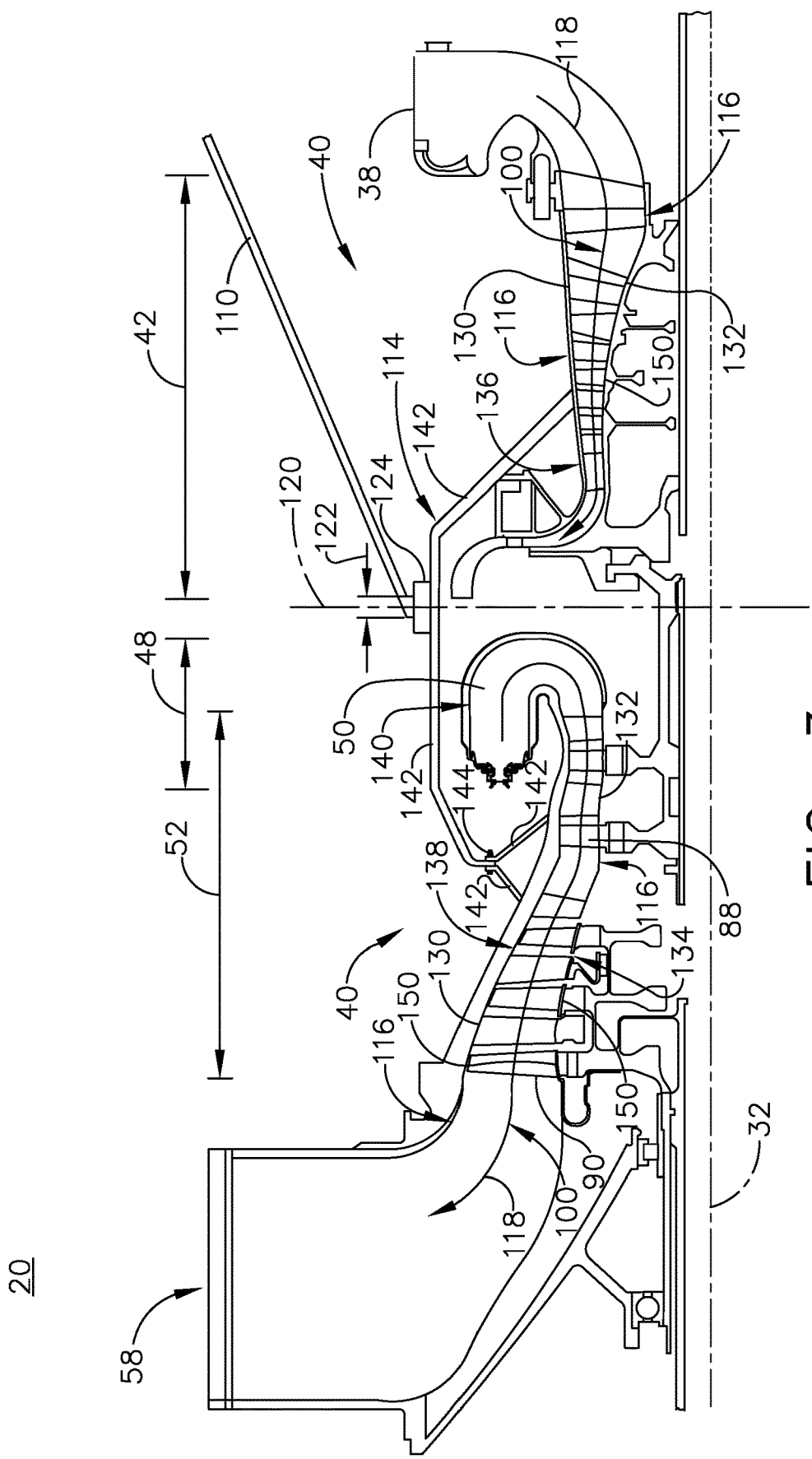
FIG. 3 is an isolated view of a structural wall of the engine core of FIG. 2 coupled to the mounting shaft and forming a mainstream flow path through the turbine engine.

Referring now to FIG. 3, the mounting strut 110 can mount the engine core 40 along a single mount plane 120. While the mounting strut 110 is illustrated as a single mounting strut 110, in the annular arrangement of the engine 20, any number of mounting strut 110 organized around the engine core 40 can be used to mount the engine 20 along the single mount plane 120. Similarly, while the single mount plane 120 is illustrated as a line through the section of the engine, the mount plane can be an annular area defined orthogonal to the engine centerline 32 at the line shown in FIG. 3. Furthermore, while described as a single mount plane 120, it should be understood that the single mount plane 120 is not limited to an infinitesimally thin width as in a geometrical plane, but can have a width 122. In one example, the width 122 can be equal to a diameter or thickness of the mounting shaft 110. For example, the width 122 can be between 0.5 inches (12 mm) and 8 inches (205 mm). At least a portion of mounting strut 110 can be positioned within the combustion section 48, and can mount radially exterior of the combustor 50. In one alternative example, the mounting strut 110 at the point of connection to the engine core 40 can be positioned exterior of the combustor 50, while it is further contemplated that the mounting strut 110 can position anywhere axially along the engine core 40, locating the single mount plane 120 anywhere along the engine core 40.

The single mount plane 120 provides for mounting the engine 20 along a single, annular mount plane at one axial position along the engine centerline 32, as opposed to mounting the engine at two or more axial positions. As such, the engine 20 can be cantilevered about the single mount plane 120 at the mounting struts 110. The single cantilevered mount plane 120 provides a weight-effective means to mount the engine 20 to the aircraft 10 of FIG. 1, which can provide for improving a power-to-weight ratio for the engine 20. The single mount plane 120 provides for avoiding secondary mount features and additional connection hardware. Such a reduction in weight is directly related to improving engine performance and efficiency.

The structural wall 116 can be a peripheral wall about the mainstream flow path 118. The mainstream flow path 118 can be defined as the flow path providing the pressurized air 100, in flow relationship, from the inlet 38, through the compressor section 42, through the combustion section 48, through the turbine section 52, and exhausting from the exhaust section 58. The structural wall 116 can be a single structural wall that is a single integral piece, or a combination of a radially outer wall 130 and a radially inner wall 132 that are joined together. In another, alternative example, the structural wall 116 can be two-part, having one piece forming the mainstream flow path 118 for the compressor section 42 and one piece forming the mainstream flow path 118 for the turbine section 52, and may or may not include the combustion section 48. In one example, the structural wall 116 can be made by additive manufacturing, such as 3D printing, to form the complex geometry of the structural wall as a single integral piece, or pieces.

The structural wall 116 can be adapted to mount and support additional structures necessary for operation. For example, one or more openings 134 can be provided in the structural wall 116 to permit the blades 88 to extend into the mainstream flow path 118 to drive the pressurized air 100. In another example, the structural wall 116 can be separated into a compressor portion 136 adapted for use in the compressor section 42, and a turbine portion 138 adapted for use in the turbine section 52. Furthermore, the structural wall 116 can include a combustion portion 140 adapted for use in the combustion section 48. It is contemplated that none, or two or more of the portions 136, 138, 140 can be integral with one another, while all of the portions 136, 138, 140 can be separate.

In one example, the structural wall 116 can couple directly to the mounting strut 110 at the single mount plane 120. Alternatively, the mounting shaft 110 can couple to the structural wall 116 via one or more secondary shafts 142. Alternatively, the structural wall 116 can couple to the mounting shaft 110 indirectly, through one or more additional structural elements 114, such as secondary shafts 142 or fasteners 144. In one example, the secondary shaft 142 can be positioned at the compressor section as a compressor shaft, or can be positioned at the turbine section as a turbine shaft.

The structural wall 116 is used to form at least a portion of the mainstream flow path 118. The structural wall 116 can directly form the mainstream flow path 118, or can support one or more structural sealing elements 150, to indirectly form the mainstream flow path 118. Such structural sealing elements 150, in non-limiting examples, can include blades, vanes, shrouds, disks, platforms, dovetails, seals, or any other rotating or non-rotating elements facing the mainstream flow path 118. The structural wall 116 serves as the structural base to carry the load for the remainder of the engine 20 in transferring the load to the mounting shaft 110.

The single wall structure for the structural wall 116 provides for an engine architecture that has a lighter-weight design as compared with engines that have structural elements in combination with a peripheral wall forming mainstream flow path. The reduced weight can provide for increased payload, or reduce the required lift which minimizes fuel burn to improve efficiency and increase total flight time.

The single wall cantilevered turbine engine addresses the challenge of improving power-to-weight ratio in two ways. First, the single mount plane is a weight-effective means to mount the engine and avoids the use of a second set of mount features and connection hardware, as well as minimizes the overall structure. The single wall of the structural wall 116 results in a lighter-weight system by functioning as both the primary engine support structure and the mainstream flow path surface. The combination of both features provides for a lowered engine radius and eliminates a second layer of axisymmetric hardware, typically used to seal the flow path. The single wall architecture allows for simplified maintenance, and includes the ability to repair minor compressor damage on-wing, as well as modular disassembly of the engine, wherein other engines, removal of the engine from the vehicle is required.

It should be appreciated that the structures and configurations of the engine 10 as described herein can be made by additive manufacturing, such as 3D printing in one non-limiting example. Additive manufacturing is beneficial in forming complex, three-dimensional geometries for engine components, such as the structural wall 116 forming the mainstream flow path 118 as described herein.

A method of mounting a turbine engine defining an engine centerline to an aircraft can include: supporting an engine core with at least one mounting strut about a single mount plane defined orthogonal to the engine centerline; and supporting a single structural wall with the at least one mounting shaft, with the single structural wall at least partially forming a mainstream flow path through the turbine engine.

Supporting the engine can include mounting the engine 20 about the single mount plane 120 orthogonal to the engine centerline 32 as described in FIG. 3. Additionally, the single structural wall can be the structural wall 116 of FIG. 3 and as described herein. Furthermore, the mounting strut can be the mounting strut 110 as described herein, and need not be limited to a strut, but can be any similar structural element, such as a beam, rod, shaft, or bar in non-limiting examples.

The method can further include mounting a nacelle or casing to the single structural wall, such as the engine nacelle or casing 62 of FIG. 2. Further still, the method can include wherein the at least one mounting shaft is configured to transfer loads from a propeller driven by the turbine engine to the aircraft.

The method can further include wherein the turbine engine includes a turbine section and a compressor section, and the at least one mounting shaft couples to the engine core between the turbine section and the compressor section. The point that the mounting strut couples to the engine core is defined along the single mount plane. As such, the single mount plane may or may not intersect a combustion section provided fluidly between the turbine section and the compressor section. The method can further include wherein the single structural wall extends from the at least one mounting shaft toward both the turbine section and the compressor section.

It should be appreciated that application of the disclosed design is not limited to turbine engines with fan and booster sections, but is applicable to turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
    an engine core defining an engine centerline and including a compressor section, a combustor section, and a turbine section in sequential flow arrangement;
    at least one mounting strut coupled to the engine core along a single mount plane between the compressor section and the turbine section; and
    a structural wall supporting the engine core coupled to the at least one mounting strut and extending within at least the compressor section and the turbine section and forming a mainstream flow path at least partially through the compressor section and the turbine section, the structural wall including one or more openings permitting one or more structural sealing elements to extend from at least one of the compressor section or the turbine section into the mainstream flow path through the structural wall.

2. The turbine engine of claim 1 wherein the single mount plane has a width between 12 mm and 205 mm.

3. The turbine engine of claim 1 wherein the at least one mounting strut mounts to the engine core radially exterior of the combustor section.

4. The turbine engine of claim 1 further comprising at least one strut mount, coupling the at least one mounting strut to the structural wall.

5. The turbine engine of claim 4 further comprising at least one structural element coupling the at least one mounting strut to the structural wall along the compressor section and the turbine section.

6. The turbine engine of claim 1 wherein the one or more structural sealing elements include at least one of a blade, a seal, or a shroud.

7. The turbine engine of claim 1 wherein the engine core defines an engine centerline and the single mount plane is defined orthogonal to the engine centerline.

8. A turbine engine comprising:
    an engine core having a compressor section and a turbine section, and including a mainstream flow path in sequential flow arrangement along the compressor section and the turbine section;
    a mounting strut configured to mount the engine core to an aircraft along a single mount plane; and
    a single structural wall at least partially forming the mainstream flow path and extending through the compressor section and the turbine section, the single structural wall including one or more openings permitting one or more structural sealing elements to extend from at least one of the compressor section or the turbine section into the mainstream flow path through the single structural wall.

9. The turbine engine of claim 8 further comprising a combustor section provided between the compressor section and the turbine section, wherein the mounting strut mounts within the combustor section.

10. The turbine engine of claim 9 wherein the one or more structural sealing elements include at least one of a blade, a seal, or a shroud.

11. The turbine engine of claim 8 further comprising an outer casing surrounding the engine core and the outer casing is supported by the structural wall.

12. A method of mounting a turbine engine defining an engine centerline to an aircraft, the method comprising:
    supporting an engine core with at least one mounting strut about a single mount plane defined orthogonal to the engine centerline; and
    supporting a single structural wall with the at least one mounting strut, with the single structural wall at least partially forming a mainstream flow path through the turbine engine, the single structural wall including one or more openings permitting one or more structural sealing elements to extend from the engine core into the mainstream flow path through the single structural wall.

13. The method of claim 12 further comprising mounting a casing to the single structural wall.

14. The method of claim 12 wherein the at least one mounting strut is configured to transfer loads from a propeller driven by the turbine engine to the aircraft.

15. The method of claim 12 wherein the turbine engine includes a turbine section and a compressor section, and the at least one mounting strut couples to the engine core between the turbine section and the compressor section.

16. The method of claim 15 wherein the single structural wall extends from the at least one mounting strut toward both the turbine section and the compressor section.

* * * * *